United States Patent [19]

Yamada

[11] Patent Number: 4,873,944
[45] Date of Patent: Oct. 17, 1989

[54] PARTIALLY LIQUID-COOLED TYPE FORCED AIR-COOLING SYSTEM FOR INTERNAL COMBUSTION ENGINE

[75] Inventor: Kiichiro Yamada, Osaka, Japan
[73] Assignee: Kubota Ltd., Osaka, Japan
[21] Appl. No.: 189,418
[22] Filed: May 2, 1988

[30] Foreign Application Priority Data

May 2, 1987 [JP] Japan ................................. 62-66913
May 2, 1987 [JP] Japan ................................. 62-66914

[51] Int. Cl.$^4$ ............................................... P01P 9/04
[52] U.S. Cl. ............................. 123/41.57; 123/41.63; 123/41.67; 123/41.7; 123/41.82 R
[58] Field of Search .... 123/41.57, 41.62, 41.64–41.67, 123/41.7, 41.82 R, 41.63, 41.69

[56] References Cited

U.S. PATENT DOCUMENTS

| | | | |
|---|---|---|---|
| 2,611,346 | 9/1952 | Sonderegger | 123/41.7 |
| 2,696,074 | 12/1954 | Dolza | 123/41.66 X |
| 4,108,118 | 8/1978 | George | 123/41.57 |

FOREIGN PATENT DOCUMENTS

| | | | |
|---|---|---|---|
| 2839622 | 3/1979 | Fed. Rep. of Germany | 123/41.57 |
| 18309 | 11/1934 | Japan . | |
| 54-32085 | 10/1979 | Japan . | |
| 96121 | 6/1983 | Japan | 123/41.57 |
| 195025 | 11/1983 | Japan | 123/41.57 |
| 2127487 | 4/1984 | United Kingdom . | |

*Primary Examiner*—Noah P. Kamen
*Attorney, Agent, or Firm*—Lowe, Price, Leblanc, Becker & Shur

[57] ABSTRACT

In a partially liquid-cooled type forced air-cooling system for an internal combustion engine which includes an air-cooled cylinder and a liquid-cooled cylinder head, a centrifugal cooling fan is provided in front of a crankcase so as to rotate about the fore and rear axis thereof, and a cooling air delivery opening is provided at the back portion of a draft chamber within a fan casing which encircles the cooling fan, so as to orientate throughflow at least to the cylinder. A portion of the encircling wall of the fan casing which is arranged at the side of the cylinder head is provided with an opening. Cylinder is adapted to be cooled adequately by the cooling air flow delivered through the opening and a radiator is adapted to be cooled effectively by the cooling air flow passing through the opening provided in the encircling wall of the fan casing so that at least a portion of the cylinder head can be cooled intensively.

17 Claims, 5 Drawing Sheets

PARTIALLY LIQUID-COOLED TYPE FORCED AIR-COOLING SYSTEM FOR INTERNAL COMBUSTION ENGINE

FIELD OF THE INVENTION

The present invention relates to a partially liquid-cooled type of forced air-cooling system for an internal combustion engine, wherein at least a high temperature portion of a cylinder head is adapted to be cooled by means of a cooling liquid.

BACKGROUND OF THE PRIOR ART

Generally, for an internal combustion engine, there are three kinds of cooling sytems, namely air-cooling liquid-cooling, and a combination type comprising both air-cooling and liquid-cooling.

An air-cooled internal combustion engine has the advantage of being constructed simply and compactly because a delivery pump for cooling liquid and a radiator therefor are unnecessary therein. But, in a different aspect, since a cylinder head thereof tends to be heated excessively due to its relatively high thermal load, an enhancement of output of such an engine is limited.

On the other hand, a liquid-cooled internal combustion engine has an advantage in that an enhancement of output thereof becomes possible owing to its intensive cooling system. However, since the engine requires a delivery pump for cooling liquid and a radiator for such an intensive cooling, it becomes complicated and large in construction (for examle, refer to British Laid Open Patent Publication No. 2127487 A).

A partially liquid-cooled internal combustion engine on the other hand has the advantage that it can be reduced in overall size due to a decreased load on the liquid-cooling apparatus and also due to the accomplishment of a small-scale radiator and a reduced quantity of circulating cooling liquid because a cylinder subjected to a relatively small thermal load is cooled by means of cooling air and at least a portion of a cylinder head subjected to a high thermal load is cooled by means of the cooling liquid.

Conventional partial liquid-cooling type forced air-cooling systems include the following:

Conventional Embodiment-1 (Japanese Utility Model Publication No. 1959-18309).

This cooling system comprises a centrifugal cooling fan disposed at the front side of the engine body of a vertical internal combustion engine so as to rotate about a fore and rear longitudinal axis thereof, a rectangular prism-shaped fan casing arranged so as to cover the cooling fan and the front sides of a cylinder and a cylinder head, a radiator located at an upper corner of the interior within the fan casing, and a cooling air guide casing extended backward from the fan casing throughout the cylinder and the cylinder head. The radiator is adapted to be cooled by the cooling air flow passing through the fan casing, and the cylinder and the cylinder head are adapted to be cooled by the cooling air flow passing through the guide casing.

However, there is the following disadvantage associated with the conventional embodiment -1 that the radiator had to be larger in size, since the cooling air flow delivered from the cooling fan to the radiator is apt to impinge to the upper wall of the fan casing at right angles therewith, a stagnation zone is presented in the space for the location of the radiator. Further, since the cooling air flow passing through the space for the location of the radiator is hindered by the cylinder head disposed at the lower reaches thereof, the air flow resistance is increased. In this way, as the space of the location of the radiator has such a stagnation of the cooling air flow and the flow resistance gets increased, the flow of cooling air supplied to the radiator is decreased. As a result, the heat per unit area radiated from the radiator decreases and the radiator has to be made correspondingly larger in size:

Conventional Embodment-2 (Japanese Utility Model Publication No. 1979-32085).

This cooling system comprises an axial flow fan (a cooling fan) arranged aside at the front position of an engine body of a vertical internal combustion engine, a cooling air guide casing extended in the fore and rear direction from the location of the axial flow fan toward a cylinder and a cylinder head, and a radiator arranged within a space provided laterally outside of the cylinder head as well as to be in the cooling air guide casing in such a manner as extending in the fore and rear direction thereof. The radiator is adapted to be cooled by means of cooling air flowing obliquely backward within the cooling air guide casing, and the cylinder and the cylinder head are adapted to be cooled by means of cooling air flow the course of which is diverted transversely thereof.

However, there are a number of following disadvantages associated with the conventional embodiment-2.

(a) The external size of the internal combustion engine becomes larger.

Since the axial flow fan and the cooling air guide casing project laterally outside of the engine body, the external size of the internal combustion becomes larger.

(b) The transmission arrangement for driving the cooling fan is complicated.

Since the axial flow fan as a cooling fan is disposed aside at the front side of the engine body, a complicated transmission arrangment is required for interlockingly connecting the input shaft of the axial flow fan to the crankshaft in the engine body.

(c) The radiator has to be made larger in size.

Since the cooling air flows obliquely backward relative to the radiator, which is arranged so to extend in the fore and rear direction, the flow of cooling air supplied to the radiator is inevitably uneven along its length. Furthermore, the total quantity of cooling air passing by the radiator is decreased because the cylinder head located at the lower reaches thereof hinders the passing of cooling air flow by acting as a large flow resistance.

In this way, as the flow of cooling air is supplied to the radiator unevenly and in a small quantity, the heat exchanging efficiency of the radiator becomes worse and as a result, a large-sized radiator is necessary owing to the small quantity of radiation of heat per unit area.

(d) The cylinder head and the cylinder are cooled under an unbalanced condition.

Since the flow of cooling air supplied to the radiator is hindered by the radiator located at the upper reaches thereof and, to the contrary a large quantity of cooling air is supplied to the cylinder due to a small flow resistance prevailing at the upper reaches thereof, the cylinder head is apt to be heated excessively by its large thermal load and the cylinder subjected to a comparatively small thermal load is apt to be cooled excessively. Either of these coolings is unbalanced. As a result, the cylinder head tends to have problems and the engine provides bad combustion performance.

Besides the above-mentioned known art, there is also available another cooling system wherein there is provided a cooling air discharge hole in the cooling air guide casing projected laterally outside of the engine body, with a radiator disposed so as to cover the discharge hole, but which has the disadvantage that since the radiator is located outside of the cooling air guide casing projected laterally of the engine body, the external size of the internal combustion engine has to be rather large.

SUMMARY OF THE INVENTION

The present invention is directed to solving the problems noted above, and has for its object to provide a small-sized high power internal combustion engine in which the external size of the radiator for cooling liquid is reduced, the transmission arrangment for driving the cooling fan is simplified and good cooling balance is maintained between the cylinder and the cylinder head.

For accomplishing the above-mentioned object, a partially liquid-cooling type forcedly air-cooling system of the present invention is constructed as follows.

The front side of a crankcase of an internal combustion engine of the type including an air-cooled cylinder and a liquid-cooled cylinder head is provided with a centrifugal cooling fan which rotates about the fore and rear longitudinal axis thereof. The back surfce of a draft chamber within a fan casing which covers the cooling fan is provided with a cooling air distribution opening at least orientated to the cylinder, and the encircling wall of the fan casing is provided with an opening at the side of the cylinder head. The cylinder is adapted to be cooled adequately by means of cooling air flow delivered through the distribution opening, as well as at least a portion of the cylinder head is adapted to be cooled intensively by cooling the radiator effectively with the cooling air delivered through the opening of the encircling wall of the the fan casing.

Accordingly, the present invention provides the following advantages:

(a) The radiator for the cooling liquid can be reduced in size.

Since the opening for the cooling air delivery and the radiator are provided respectively at external positions in the diametral direction of the centrifugal cooling fan, the radiator can be supplied with a sufficient quantity of cooling air evenly and powerfully. Further, since at the upper reaches as well as at the lower reaches of the radiator there are no obstacles to the supply of the cooling air toward the radiator, the flow resistance for the cooling air can be reduced significantly.

Therefore, the whole of the radiator can be supplied with a sufficient quantity of cooling air so as to enhance the heat exchange efficiency thereof. Accordingly, the radiator can be constructed in a small size because of an increased radiation heat quantity per unit area thereof.

(b) The external size of the internal combustion engine can be reduced.

Since the centrifugal cooling fan is provided at the front location of the crankcase so as to rotate about the fore and rear axis, the fan casing to encircle the cooling fan can be reduced in its extent projecting laterally outside the engine body. Further, since the radiator is arranged at the side of the cylinder head outside the fan casing, it can be accommodated within the rectangular space of the internal combustion engine. As a result, the external size of the engine can be reduced.

(c) Since the cooling fan is directly connected to a rotation shaft such as a crankshaft, the transmission means such as a transmission belt, transmission pulleys and the like can be omitted and the transmission arrangement for the cooling fan can be simplified.

(d) A good cooling balance can be maintained between the cylinder and the cylinder head.

Since the radiator is cooled sufficiently by the cooling air delivered through the opening while the cylinder is cooled adequately by the cooling air delivered through the distribution opening, the cylinder which is subjected to a comparatively small thermal load can be prevented from being cooled excessively and the cylinder head which is subjected to a relatively large thermal load can be cooled intensively. Accordingly, the cylinder and the cylinder head can be cooled under a well-balanced cooling condition, so that both the enhancement of the combustion performance and the prevention of deposits of carbon or the like sticking in the cylinder head can be attained simultaneously.

By the above-mentioned advantageous features of the items from (a) to (d), the internal combustion engine according to the present invention can have a small-scale construction and a high output power.

(e) Additionally, when a delivery opening for the cooling fan is provided so as to be oriented with the cylinder and the cylinder head as well as the cylinder head, is provided with a cooling air passage of which an inlet is oriented to the delivery opening of the fan casing, the further following advantages can be attained.

Since the cylinder head is cooled by the cooling air delivered through the delivery opening, the capacity of the radiator can be lessened correspondingly. Hence, a reduction of the radiator size as well as a decrease of the circulation quantity of the cooling liquid can be accomplished, and the size of the cooling system can be reduced as a whole.

BRIEF DESCRIPTION OF THE DRAWINGS

FIGS. 1 and 2 show the first preferred embodiment;

FIG. 1 is a front view showing an internal combustion engine including a fan casing shown in a vertical sectional view;

FIG. 2 is a vertical sectional side view of the internal combustion engine;

FIG. 3 is a partial view showing variation of the above-mentioned first embodiment;

FIGS. 4 through 6 show the second embodiment;

FIG. 4 is a view of the second embodiment corresponding to FIG. 1;

FIG. 5 is a view corresponding to FIG. 2;

FIG. 6 is a vertical sectional back view of a principal part of the second embodiment; and FIG. 7 is a partial view showing a variation of the above-mentioned second embodiment.

DESCRIPTION OF THE PREFERRED EMBODIMENTS

Figure 1:
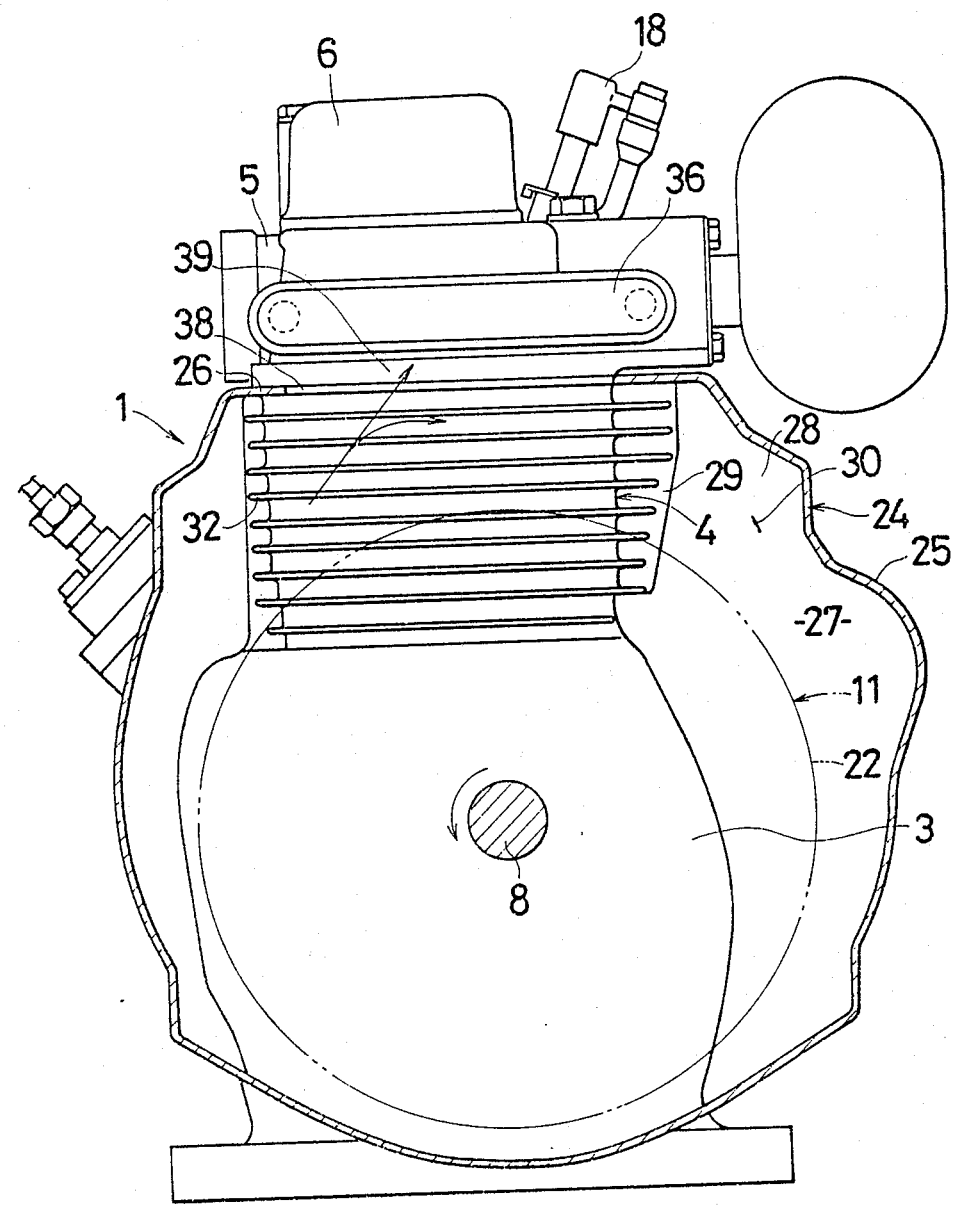
FIG. 1 through FIG. 7 show embodiments of the present invention.
Figure 2:
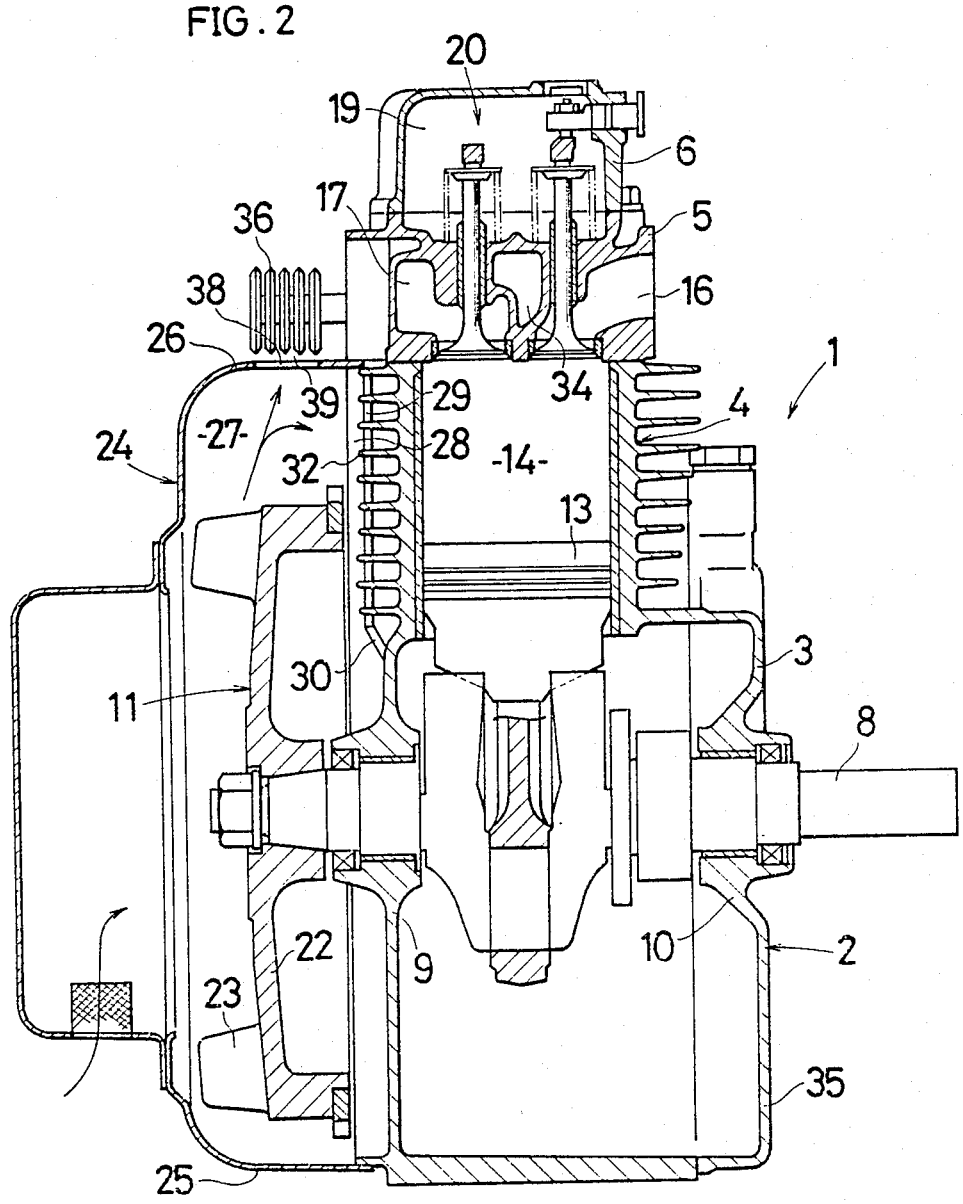

FIGS. 1 and 2 show the first preferred embodiment of the present invention.

An internal combustion engine 1 is an overhead-valve type direct-injection Diesel engine constructed as follows.

An engine body 2 comprises a crankcase 3, a cylinder 4 integrally formed at the upper side thereof, a cylinder head 5 and a rocker cover 6 each of which is arranged in order upwardly.

The crankcase 3 is equipped with a crankshaft (rotation shaft) 8 supported rotatably at a middle level position thereof in such a state as to extend in the fore and rear direction (in the "left" and "right" directions in FIG. 2, hereinafter). The crankshaft 8 projects outwardly from the front and back opposite walls 9, 10 of the crankcase 3. The back end portion thereof projected from the back wall (at the right side wall) 10 is formed as an output portion, and the other end portion thereof projected from the front wall (the left side wall) 9 has a centrifugal cooling fan 11 fixedly secured thereto. A piston 13 is provided to be vertically slidable in the cylinder 4 and there is provided a combustion chamber 14 above the piston 13. Cylinder head 5 is provided with an intake port 16 and an exhaust port 17 therein and is further equipped with a fuel injector 18. The tip portion of the fuel injection nozzle of the injector 18 is present in the combustion chamber 14 so as to provide a direct-injection type engine. There is also provided a valve actuation mechanism 20 within a rocker arm chamber 19 enshrouded by the rocker cover 6.

The cooling fan 11 comprises a plurality of vanes 23 which are protruded on the front surface of a flywheel 22 fixed to the front end portion of the crankshaft 8. A fan casing 24 is attached to the engine body 2 in such a manner as to be encircling the cooling fan 11. The encircling wall 25 of the fan casing 24 has a portion 26 arranged at the side of the cylinder head 5, which is located at the same height as that of the upper end surface of cylinder 4 at the side of the cylinder head 5. An air intake opening, as best seen in FIG. 2, enables cooling air as indicated by arrow A, to be supplied to the fan. In the back wall (the right side wall in FIG. 2) 28 of the draft chamber 27 formed within the fan casing 24, there is provided a delivery opening 29 oriented to th cylinder 4, i.e., the front end wall of the crankcase 3 is extended transversely outwardly so as to form the back wall 30 of the draft chamber 27, and the back wall 30 is provided with the delivery opening 29 formed by cutting out the upper portion thereof 30. The cooling air flow delivered through the opening 29 is thus adapted to come into contact with cooling fins 32 formed on the peripheral wall of the cylinder 4 in order to cool the cylinder 4 adequately.

On the one hand, the cylinder head 5 has a liquid-cooling jacket 34 formed substantially throughout therein. The liquid-cooling jacket 34 is adapted to be supplied with a portion of the lubricating oil which is delivered to the cylinder head 5 under pressure by a lubricating oil delivery pump (omitted in drawings) from an oil pan 35 in order to lubricate the valve actuation mechanism 20 within the rocker arm chamber 19. The liquid-cooling jacket 34 is connected in communication to a radiator (an oil-cooler) 36 arranged above the fan casing 24 so that the lubricating oil passing through the jacket 34 can be cooled by means of the radiator 36 and then returned to the oil pan 35.

Further, in the upper wall portion 26 of the encircling wall 25 of the fan casing 24 at the side of the cylinder head 5, there is provided a distribution opening 38 elongated laterally (in the left and right direction in FIG. 1). The radiator 36 is arranged so as to cover the outlet of the flow passage 39 of cooling air delivered through the opening 38. The cooling air flowing along the flow passage 39 is thus adapted to come into contact with the radiator 36 and to cool the radiator 36 sufficiently. In this case, since the radiator 36 also functions as an air flow resistance, the flow of cooling air delivered from the opening 29 to the cylinder 4 is prevented from decreasing extremely.

Instead of the cylinder head 5, in which the liquid-cooling jacket 34 is formed substantially throughout therein in this embodiment, there may be adopted another cylinder head in which the liquid-cooling jacket 34 is formed only around the injection nozzle of the fuel injector 18 so as to carry out an intensive cooling of a portion subjected to an especially large thermal load.

Delivery opening 29 formed by the cutout at the upper portion of the back wall 30 of the draft chamber 27 may be replaced with another opening of a type comprising the fan casing 24 formed by an air guide plate configured in an annular shape viewed from a back side and the draft chamber 27 opened backward.

Figure 3:
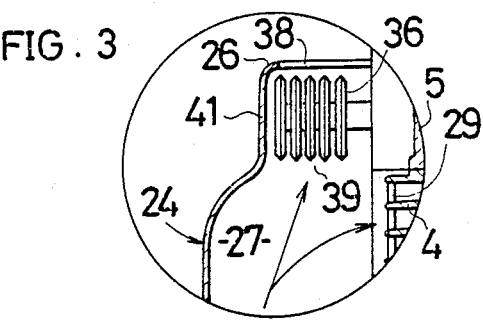

FIG. 3 is a view showing a variation obtained by modifying a portion of the first embodiment as follows. The portion 26 of the encircling wall 2 of the fan casing 24 at the side of cylinder head 5 is formed in an upwardly swelled out state in this variation. The radiator 36 is arranged across a cooling air passage directed from the draft chamber 27 to the opening 38 within the swelled out portion 41.

Figure 4:
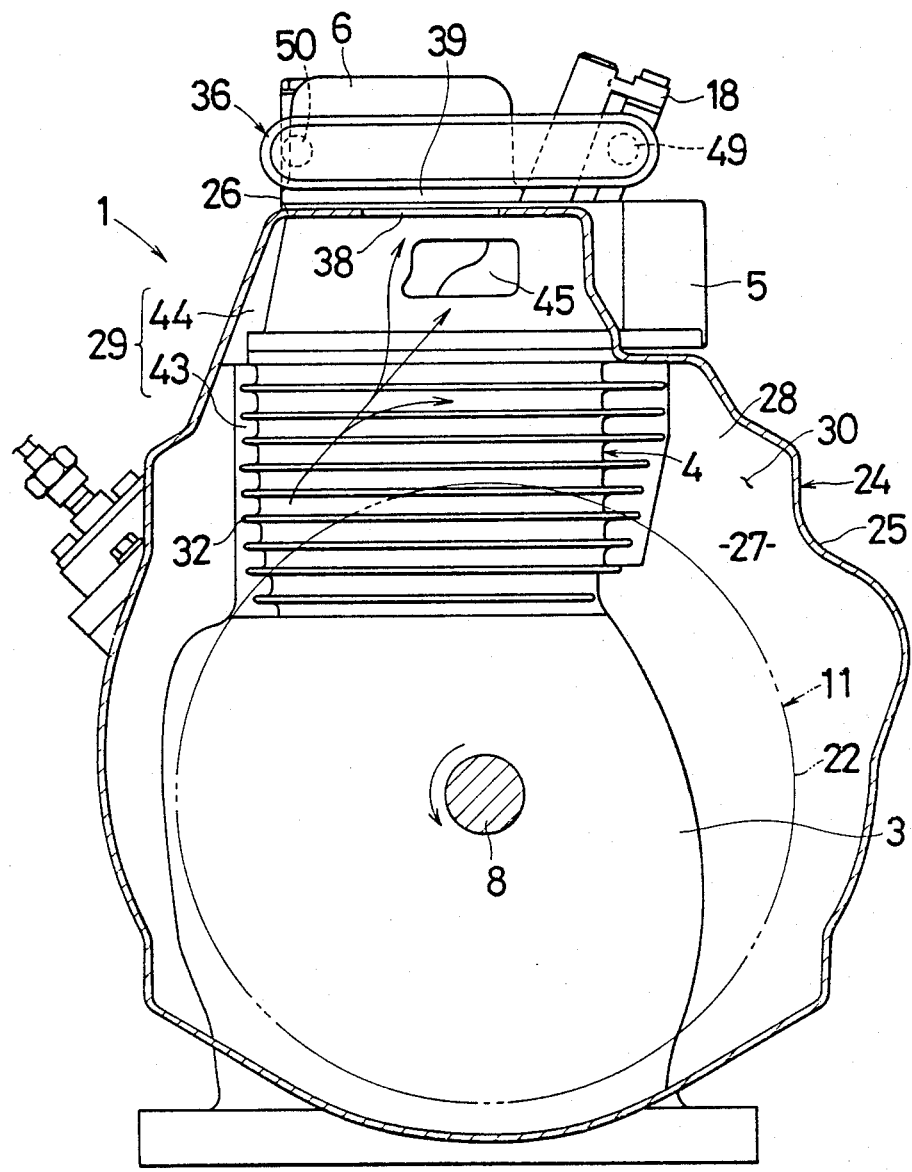
Figure 6:
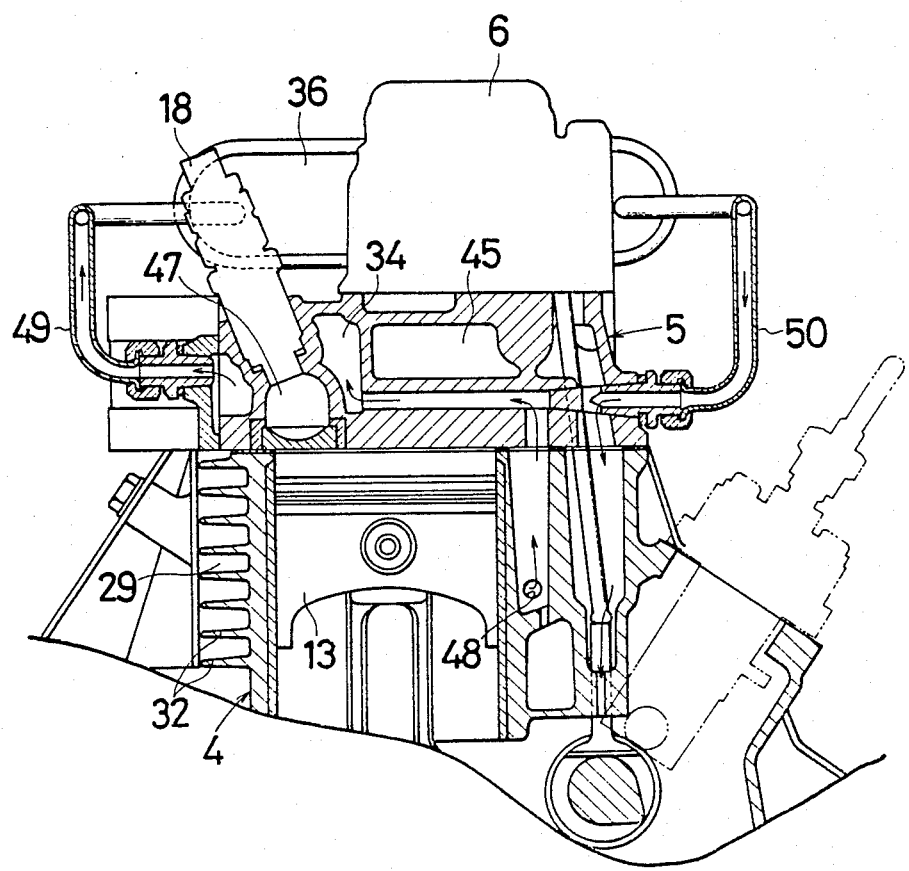
Figure 5:
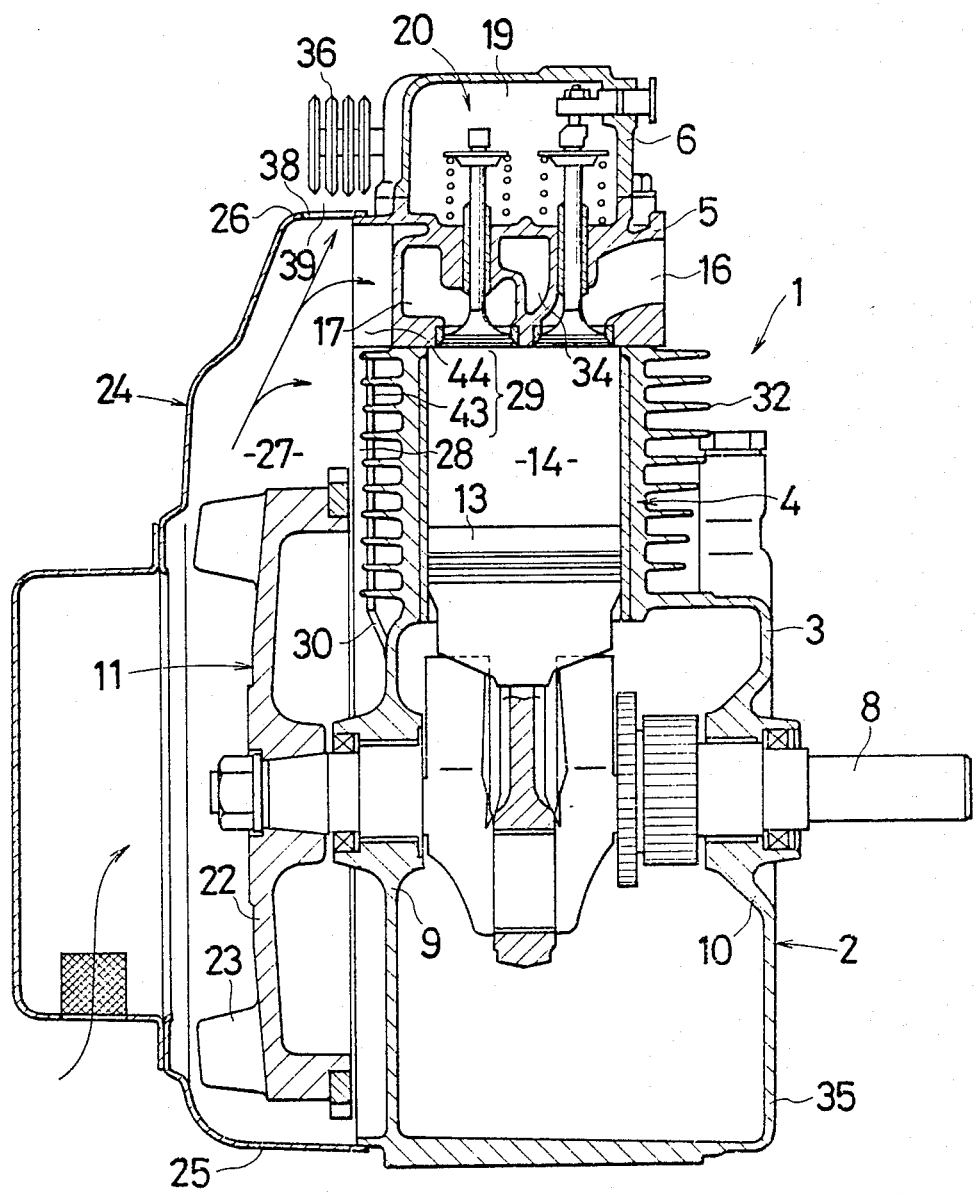

FIGS. 4 through 6 show the second embodiment. Aspects thereof that are different from the first embodiment will be explained hereinafter. In this second embodiment, the component parts having the same function as ones in the first embodiment are indicated by the same symbols.

In this embodiment, an internal combustion engine 1 is a divided-combustion chamber type of Diesel engine.

An upper portion 26 of an encircling wall 25 of a fan casing 24 at the side of cylinder head 5 is located substantially at the same height as that of an upper end surface of a cylinder head 5 at the side of a rocker arm chamber 19. The back wall (the right side wall in FIG. 5) 28 of a draft chamber 27 formed within the fan casing 24 is provided with a cooling air delivery opening 29 which is orientated to the cylinder 4 and the cylinder head 5. That is, as in the above-mentioned first embodiment, the back wall 30 of the draft chamber 27 is formed by the outward extensions of the front end wall of the crankcase 3, and a cooling air delivery opening 43 for the cylinder 4 is formed by cutting out the upper half of the back wall 30. Further, a cooling air delivery opening 44 for the cylinder head 5 is formed by opening backward the upper portion of the draft chamber 27 within the fan casing 24. These delivery openings 44, 43 for the cylinder and the cylinder head form the delivery opening 29 in combination.

Further, as shown in FIGS. 4 and 6, the cylinder head 5 is provided with a cooling air passage 45 formed at the middle level thereof in such a way as to extend in the fore and rear direction so that the inlet of the passage 45 is oriented to the delivery opening 29.

As shown in FIG. 6, the cylindee head 5 is provided with a liquid-cooling jacket 34 formed around the divided-combustion chamber 47. The lubricating oil delivered from a pump omitted in the drawings is adapted to be supplied to the liquid-cooling jacket 34 via a delivery port 48 provided at a lateral portion of the cylinder 4. The lubricating oil flow gets hot by heat absorption in its passage through the jacket 34. It is adapted to be then sent to a radiator 36 through its inlet pipe 49 in order to carry out heat transfer by radiation therein and is returned to an oil pan 35.

The cooling air flow delivered through the opening 29 is adapted to come into contact with cooling fins 32 formed on the peripheral wall of the cylinder 4 to cool the cylinder 4 adequately as well as to come into contact with the external periphery of the cylinder head 5 and the internal periphery of the cooling air passage 45 to cool the cylinder head 5. In this way, since the cylinder head 5 is cooled effectively by air, the capacity of the radiator 36 can be reduced correspondingly and, as a result, the radiator can be reduced in size.

Figure 7:
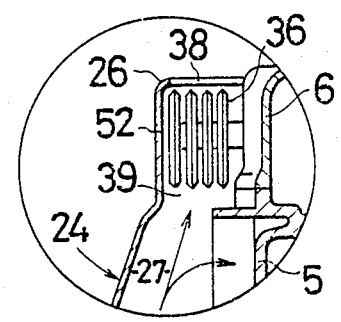

FIG. 7 shows a variant example obtained by modifying a portion of the above-mentioned second embodiment as follows. That is, the portion 26 of the encircling wall 25 of the fan casing 24 at the side of the cylinder head 5 is swelled out upwardly. The radiator 36 is arranged within the swelled out portion 52 across the cooling air passage directed from the draft chamber 27 to the opening 38.

Incidentally, the lubricating oil used as the cooling liquid for the cylinder head 5 in the above-mentioned respective embodiments may be replaced with water or other kinds of liquid.

Further, instead of the vertical engine, a horizontal engine may be adopted as the internal combustion engine.

I claim:

1. A partially liquid-cooled air-cooling system for an internal combustion engine, comprising:
   a rotatable shaft projecting forwardly from a front wall of a crankcase of said internal combustion engine, said shaft having a centrifugal cooling fan fixedly secured thereto in front of a crankcase, said cooling fan being encircled by a fan casing;
   a back portion of a draft chamber formed within said fan casing, provided with a cooling air delivery opening adapted to direct cooling air about at least a cylinder of the engine;
   a liquid-cooling jacket, formed to be in at least a portion of a cylinder head of the engine so as to be connected in communication to a radiator for cooling a flow of a cooling liquid therethrough; and
   an upper wall portion of an encircling wall of said fan casing being provided with an air distribution opening arranged at a side of said cylinder head, said radiator being located adjacent to said distributing opening.

2. The partially liquid-cooled type forced air-cooling system for an internal combustion engine as defined in claim 1, wherein:
   said upper wall portion of the encircling wall of the fan casing is located substantially at the same height as that of the upper end surface of the cylinder, and an intake opening provided in the fan casing.

3. The partially liquid-cooled type forced air-cooling system for an internal combustion engine as defined in claim 2, wherein:
   said radiator is arranged so as to cover the outlet side of the distribution opening.

4. The partially liquid-cooling type forced air cooling system for an internal combustion engine as defined in claim 2, wherein:
   said internal combustion engine is a direct-injection Diesel engine.

5. The partially liquid-cooling type forced air-cooling system for an internal combustion engine as defined in claim 2, wherein:
   said internal combustion engine is a divided-combustion chamber type Diesel engine.

6. The partially liquid-cooled type forced air-cooling system for an internal combustion engine is defined in claim 1, wherein:
   said upper wall portion of the encircling wall of the fan casing which is arranged at the side of a rocker arm chamber of the cylinder head, is located substantially at the same height as that of the upper end surface of the cylinder head said delivery opening further directing cooling air about the cylinder head, and
   said cylinder head is provided with a cooling air passage of which an inlet is adjacent to the delivery opening.

7. The partially liquid-cooled type forced air-cooling system for an internal combustion engine as defined in claim 3, wherein:
   said radiator is arranged so as to cover the outlet side of the distribution opening.

8. The partially liquid-cooling type forced air cooling system for an internal combustion engine as defined in claim 6, wherein:
   said internal combustion engine is a direct-injection Diesel engine.

9. The partially liquid-cooling type forced air-cooling system for an internal combustion engine as defined in claim 6, wherein:
   said internal combustion engine is a divided-combustion chamber type Diesel engine.

10. The partially liquid-cooling type forced air-cooling system for an internal combustion engine as defined in claim 1, wherein:
    said internal combustion engine is a direct-injection Diesel engine.

11. The partially liquid-cooling type forced air-cooling system for an internal combustion engine as defined in claim 10, wherein said liquid-cooling jacket is provided only around an injection nozzle of a fuel injector.

12. The partially liquid-cooling type forced air-cooling system for an internal combustion engine as defined in claim 10, wherein:
    said liquid-cooling jacket is provided substantially throughout the cylinder head.

13. The partially liquid-cooling type forced air-cooling system for an internal combustion engine as defined in claim 1, wherein:
    said internal combustion engine is a divided-combustion chamber type Diesel engine.

14. The partially liquid-cooling type forced air-cooling system for an internal combustion engine as defined in claim 13, wherein said liquid-cooling jacket is provided only around the divided-combustion chamber.

15. The partially liquid-cooling type forced air-cooling system for an internal combustion engine as defined in claim 13, wherein:
    said liquid-cooling jacket is provided substantially throughout the cylinder head.

16. The partially liquid-cooled type forced air-cooling system for an internal combustion engine as defined in claim 1, wherein:
    said radiator is arranged so as to cover the outlet side of the distribution opening.

17. The partially liquid-cooling type forced air-cooling system for an internal combustion engine as defined in claim 1, wherein said liquid-cooling jacket is provided substantially throughout the cylinder head.

* * * * *